United States Patent
Sasamoto

(10) Patent No.: US 10,374,238 B2
(45) Date of Patent: Aug. 6, 2019

(54) FUEL CELL STACK

(71) Applicant: HONDA MOTOR CO., LTD., Minato-ku, Tokyo (JP)

(72) Inventor: Kazuya Sasamoto, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/617,671

(22) Filed: Jun. 8, 2017

(65) Prior Publication Data
US 2017/0271692 A1    Sep. 21, 2017

Related U.S. Application Data

(63) Continuation of application No. 14/179,656, filed on Feb. 13, 2014, now abandoned.

(30) Foreign Application Priority Data

Feb. 18, 2013  (JP) .................................. 2013-029112
Feb. 18, 2013  (JP) .................................. 2013-029118

(51) Int. Cl.
*H01M 8/04089*    (2016.01)
*H01M 8/241*    (2016.01)
(Continued)

(52) U.S. Cl.
CPC ....... *H01M 8/04089* (2013.01); *H01M 8/241* (2013.01); *H01M 8/2483* (2016.02); *H01M 8/2485* (2013.01); *H01M 2008/1095* (2013.01)

(58) Field of Classification Search
CPC ..... H01M 2008/1095; H01M 8/04089; H01M 8/2465; H01M 8/2485
See application file for complete search history.

(56) References Cited

U.S. PATENT DOCUMENTS

| 4,670,361 A | 6/1987 | Tsutsumi et al. |
| 6,179,342 B1 * | 1/2001 | Shen .................. F15D 1/04 285/129.2 |

(Continued)

FOREIGN PATENT DOCUMENTS

| DE | 1450237 U | 1/1943 |
| DE | 195 22 196 A1 | 1/1997 |

(Continued)

OTHER PUBLICATIONS

German Search Report dated Oct. 2, 2014, issued over DE Patent Application No. 10 2014 202 510.9, which corresponds to parent U.S. Appl. No. 14/179,656, and the English translation thereof.

*Primary Examiner* — Jonathan G Leong
*Assistant Examiner* — Victoria H Lynch
(74) *Attorney, Agent, or Firm* — Carrier Blackman & Associates, P.C.; Joseph P. Carrier; Fulchand P. Shende

(57) ABSTRACT

A fuel cell stack is formed by stacking a plurality of fuel cells in a stacking direction. Each fuel cell is formed by stacking a membrane electrode assembly and a separator together. The membrane electrode assembly includes a pair of electrodes and an electrolyte membrane interposed between the electrodes, end plates provided at both ends, a fluid passage extending in the stacking direction for allowing one of reactant gases and a coolant to flow through the fluid passage, a connection pipe connecting the fluid passage and an external pipe. The connection pipe has one fluid inlet, two intermediate pipe portions branched from the one fluid inlet, and two fluid outlets. A total intermediate opening cross sectional area is larger than an inlet opening cross sectional area of the one fluid inlet, and the total intermediate opening cross sectional area is larger than a total outlet opening cross sectional area.

18 Claims, 17 Drawing Sheets

(51) Int. Cl.
    *H01M 8/2483*     (2016.01)
    *H01M 8/2485*     (2016.01)
    *H01M 8/1018*     (2016.01)

(56) References Cited

U.S. PATENT DOCUMENTS

| | | |
|---|---|---|
| 2008/0160372 A1 | 7/2008 | Shiomi |
| 2009/0233139 A1* | 9/2009 | Suzuki ............. H01M 8/04067 429/434 |
| 2011/0053033 A1* | 3/2011 | Kobayashi ........ H01M 8/04029 429/458 |
| 2013/0004876 A1 | 1/2013 | Suzuki |

FOREIGN PATENT DOCUMENTS

| | | |
|---|---|---|
| DE | 10 2009 047 957 A1 | 4/2011 |
| JP | 02-007348 A | 1/1990 |
| JP | 2000-090954 A | 3/2000 |
| JP | 2009-004124 A | 1/2009 |
| JP | 2009-224194 A | 10/2009 |
| JP | 2010-281224 A | 12/2010 |

\* cited by examiner

FUEL CELL STACK

CROSS-REFERENCE TO RELATED APPLICATIONS

The present application is a continuation of prior U.S. patent application Ser. No. 14/179,656, filed on Feb. 13, 2014, which is based upon and claims the benefit of priority from Japanese Patent Applications No. 2013-029112 filed on Feb. 18, 2013 and No. 2013-029118 filed on Feb. 18, 2013, the contents all of which are incorporated herein by reference.

BACKGROUND OF THE INVENTION

Field of the Invention

The present invention relates to a fuel cell stack formed by stacking a plurality of fuel cells. Each of the fuel cells is formed by stacking a membrane electrode assembly and a separator together. The membrane electrode assembly includes a pair of electrodes and an electrolyte membrane interposed between the electrodes.

Description of the Related Art

For example, in a solid polymer electrolyte fuel cell, a polymer ion exchange membrane as an electrolyte membrane is interposed between an anode and a cathode to form a membrane electrode assembly (MEA). The membrane electrode assembly and a pair of separators sandwiching the membrane electrode assembly make up a power generation cell for generating electricity. In use, a predetermined number of power generation cells are stacked together to form a fuel cell stack, e.g., mounted in a vehicle.

In the fuel cell, a fuel gas flow field for supplying a fuel gas to the anode and an oxygen-containing gas flow field for supplying an oxygen-containing gas to the cathode are formed in surfaces of separators. Further, a coolant flow field is formed between adjacent separators for supplying a coolant along the surfaces of the separators.

At least fluid passages such as a fuel gas supply passage for supplying the fuel gas to the fuel gas flow field and a fuel gas discharge passage for discharging the consumed fuel gas from the fuel gas flow field are formed in an end plate provided at one end in the stacking direction. Further, fluid passages such as an oxygen-containing gas supply passage for supplying the oxygen-containing gas to the oxygen-containing gas flow field and an oxygen-containing gas discharge passage for discharging the consumed oxygen-containing gas from the oxygen-containing gas flow field are formed in the end plate.

This internal manifold type fuel cell is connected to external equipment such as a humidifier for humidifying the oxygen-containing gas and the fuel gas before the gases are supplied to the fuel cell. In this regard, in most cases, external pipes provided in the external equipment have a cylindrical shape. On the other hand, fluid passages formed in the end plate have a rectangular or triangular (non-circular) shape. Therefore, it is difficult to connect the circular external pipes to the non-circular fluid passages in an air-tight manner.

As a fuel cell stack aimed to address the problem, a fuel cell stack disclosed in Japanese Laid-Open Patent Publication No. 2009-224194 (hereinafter referred to as the conventional technique 1) is known. In the fuel cell stack, resin connection pipes are provided at one of end plates to connect non-circular passages and circular external pipes. Each of the resin connection pipes includes a non-circular cylindrical portion connected to the non-circular passage, a circular cylindrical portion connected to the circular external pipe, and a cylindrical portion having a connector shape connecting the non-circular cylindrical portion and the circular cylindrical portion in the thickness direction of the one of the end plates.

Further, in the internal manifold type fuel cell, piping structure is adopted for connecting the fluid passages and the external equipment. As a technique of this type, for example, piping structure of a fuel cell stack disclosed in Japanese Laid-Open Patent Publication No. 2006-228632 (hereinafter referred to as the conventional technique 2) is known.

In the piping structure, as shown in FIG. 17, a fuel cell stack 2 for generating electrical energy by inducing electrochemical reactions of a fuel gas and an oxygen-containing gas is provided. An oxygen-containing gas inlet pipe 3, a coolant water inlet pipe 4, a fuel gas outlet pipe 5, a coolant water outlet pipe 6, a fuel gas inlet pipe 7, and an oxygen-containing gas outlet pipe 8 are connected to the fuel cell stack 2 through a fuel cell manifold 9.

The oxygen-containing gas inlet pipe 3 supplies the oxygen-containing gas to the fuel cell stack 2, the coolant water inlet pipe 4 supplies the coolant water to the fuel cell stack 2, and the fuel gas outlet pipe 5 discharges the fuel gas from the fuel cell stack 2. The coolant water outlet pipe 6 discharges the coolant water from the fuel cell stack 2, the fuel gas inlet pipe 7 supplies the fuel gas to the fuel cell stack 2, and the oxygen-containing gas outlet pipe 8 discharges the oxygen-containing gas from the fuel cell stack 2.

SUMMARY OF THE INVENTION

In the above conventional technique 1, one end of the circular external pipe is connected to the resin connection pipe, and the other end of the circular external pipe is connected to the external equipment. In this case, in particular, when fluid from the external pipe flows through the resin connection pipe and the fluid is supplied to the fuel cell stack, pressure loss occurs easily in the pipes. Therefore, the fluid does not flow smoothly in the pipes.

Further, in the conventional technique 2, each of the pipes is bent at an angle of substantially 90° to have an L-shape. Therefore, pressure loss occurs easily in the pipes, and the fluid does not flow smoothly.

The present invention has been made to solve the problem of this type, and an object of the present invention is to provide a fuel cell stack which makes it possible to suppress pressure loss in pipes as much as possible for allowing fluid to flow smoothly.

The present invention relates to a fuel cell stack formed by stacking a plurality of fuel cells in a stacking direction. Each of the fuel cells is formed by stacking a membrane electrode assembly and a separator together. The membrane electrode assembly includes a pair of electrodes and an electrolyte membrane interposed between the electrodes. End plates are provided at both ends in the stacking direction of the fuel cells. A fluid passage extends through the fuel cells in the stacking direction for allowing at least one of reactant gases and a coolant to flow through the fluid passage. A connection pipe connecting the fluid passage and an external pipe is connected to at least one of the end plates.

In the connection pipe of the fuel cell stack, the opening cross sectional area of an intermediate pipe portion is larger than the opening cross sectional area of a fluid inlet and the opening cross sectional area of a fluid outlet.

In the present invention, since the pressure loss of the fluid in the connection pipe is suppressed as much as possible, the fluid can flow through the connection pipe smoothly and reliably. In particular, even in the case where the connection pipe is curved at its intermediate position, the fluid can flow smoothly without any increase in the internal pressure loss.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
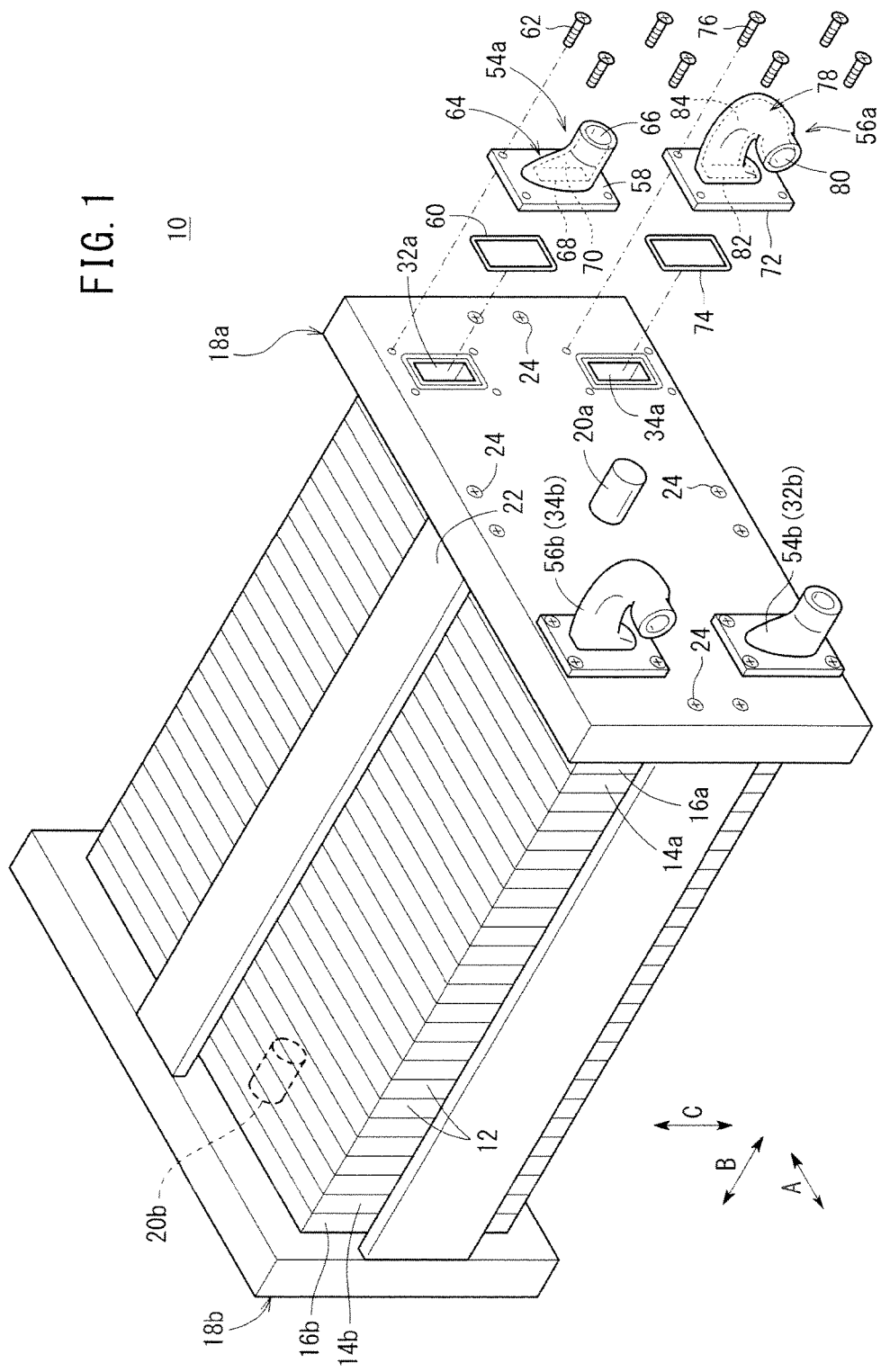
FIG. 1 is a perspective view schematically showing a fuel cell stack according to a first embodiment of the present invention, as viewed from a side where a first end plate of the fuel cell stack is provided.
Figure 2:
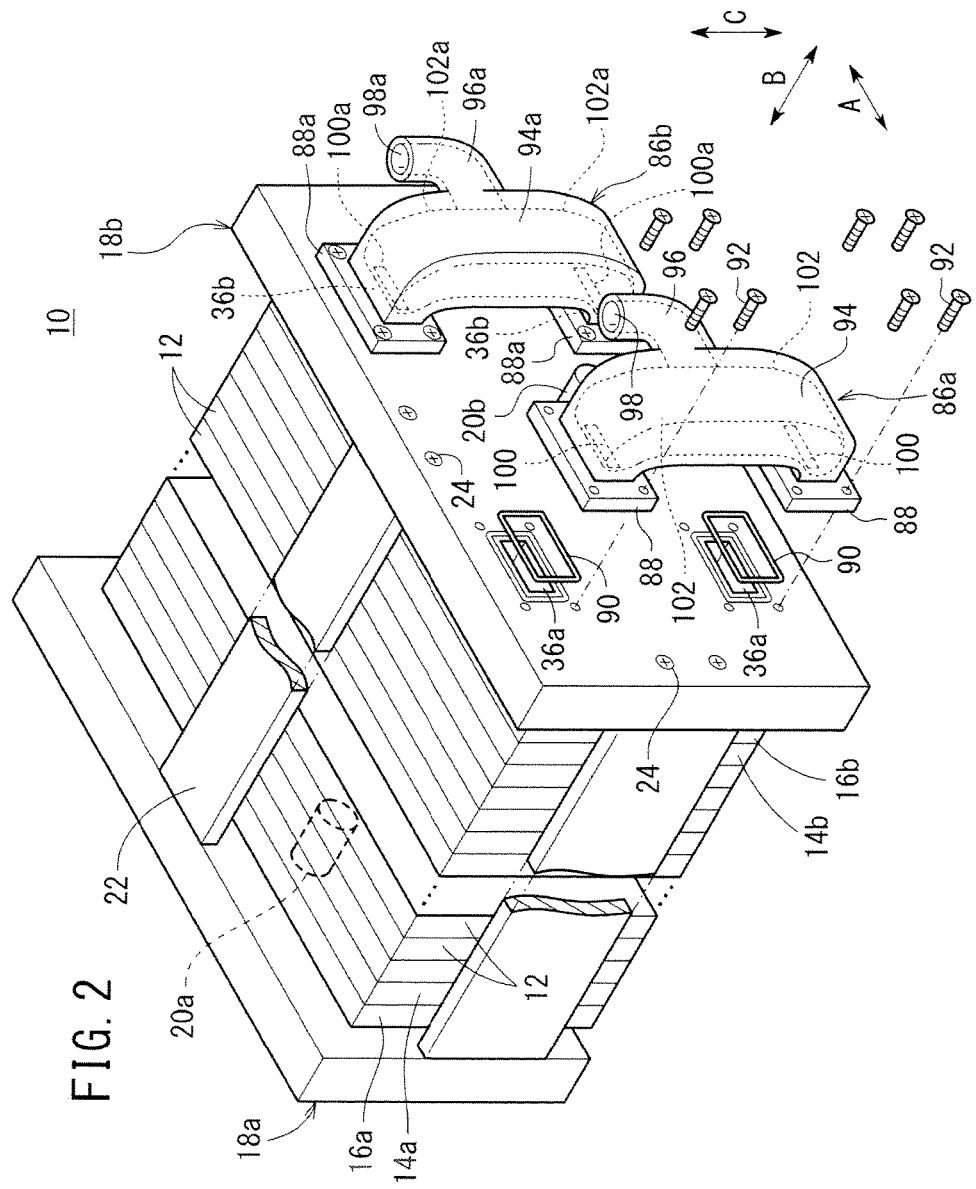
FIG. 2 is a perspective view schematically showing the fuel cell stack, as viewed from a side where a second end plate of the fuel cell stack is provided.

A fuel cell stack 10 according to a first embodiment of the present invention, as shown in FIGS. 1 and 2, is, e.g., mounted in a fuel cell electric vehicle (not shown). The fuel cell stack 10 is formed by stacking a plurality of fuel cells 12 in a horizontal direction indicated by an arrow B such that electrode surfaces of the fuel cells 12 are oriented upright.

It should be noted that the fuel cells 12 may be stacked in the direction of gravity to form the fuel cell stack 10.

At one end of the fuel cell 12 in the stacking direction, a first terminal plate 14a is provided. A first insulating plate 16a is provided outside the first terminal plate 14a, and a first end plate 18a is provided outside the first insulating plate 16a. At the other end of the fuel cell 12 in the stacking direction, a second terminal plate 14b is provided. A second insulating plate 16b is provided outside the second terminal plate 14b, and a second end plate 18b is provided outside the second insulating plate 16b.

A first power output terminal 20a connected to the first terminal plate 14a extends outward from a central portion of the first end plate 18a having a laterally elongated shape (see FIG. 1). A second power output terminal 20b connected to the second terminal plate 14b extends outward from a central portion of the second end plate 18b having a laterally elongated shape (see FIG. 2).

Both ends of connection bars 22 are fixed to intermediate positions of respective sides of the first end plate 18a and the second end plate 18b using screws 24 to apply a tightening load to the stacked fuel cells 12 in the stacking direction indicated by the arrow B.

Figure 3:
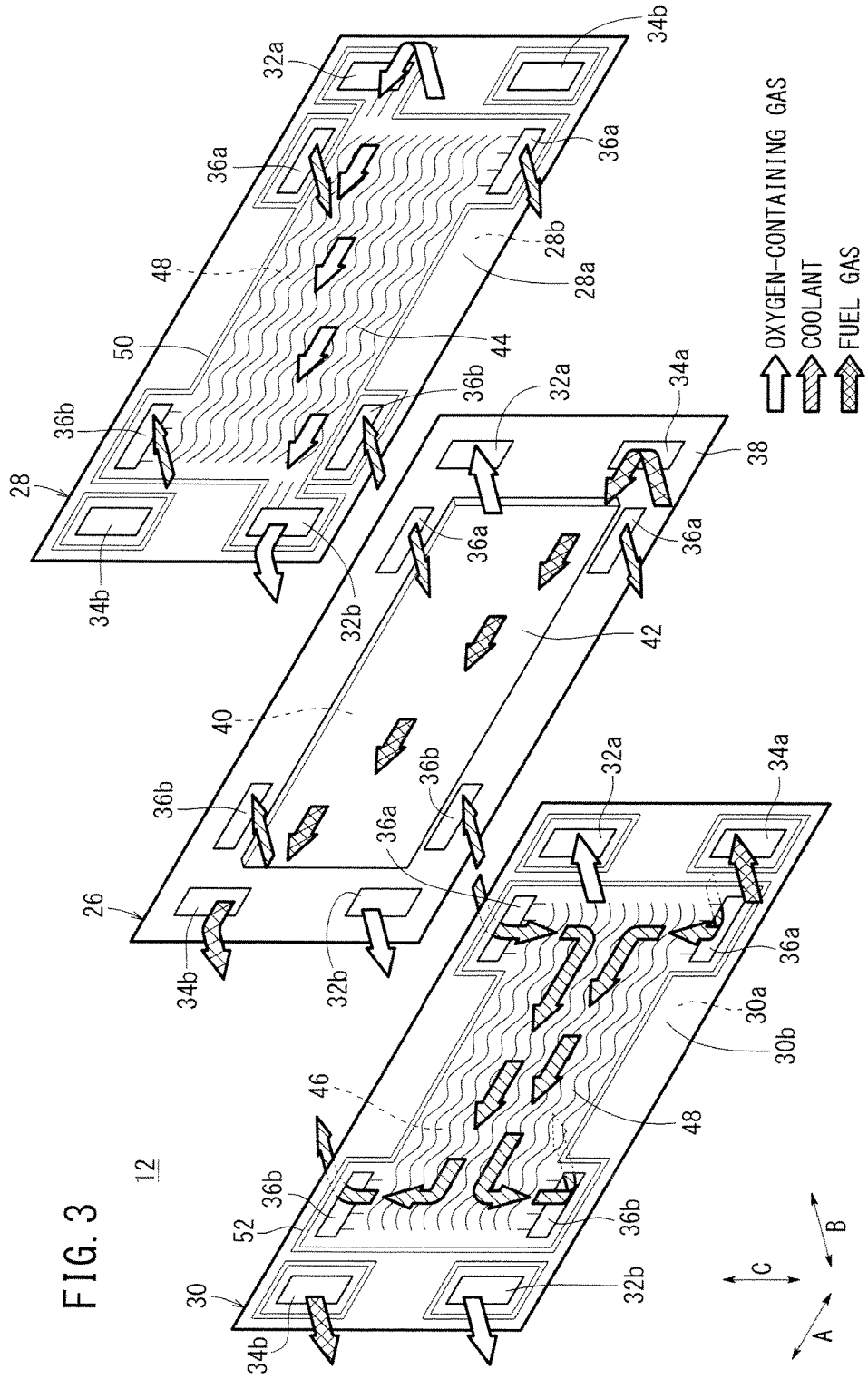
FIG. 3 is an exploded perspective view showing main components of a fuel cell of the fuel cell stack.

As shown in FIG. 3, the fuel cell 12 includes a membrane electrode assembly 26, and a first separator 28 and a second separator 30 sandwiching the membrane electrode assembly 26.

For example, the first separator 28 and the second separator 30 are made of metal plates such as steel plates, stainless steel plates, aluminum plates, plated steel sheets, or metal plates having anti-corrosive surfaces by surface treatment. For example, the first separator 28 and the second separator 30 have rectangular planar surfaces, and are formed by corrugating metal thin plates by press forming to have a corrugated shape (i.e., ridges and grooves) in cross section. Instead of the metal separators, for example, carbon separators may be used as the first separator 28 and the second separator 30.

The first separator 28 and the second separator 30 have a laterally elongated shape. Long sides of the first separator 28 and the second separator 30 extend in the horizontal direction indicated by the arrow A, and short sides of the first separator 28 and the second separator 30 extend in the direction of gravity indicated by the arrow C. Alternatively, short sides of the first separator 28 and the second separator 30 may extend in the horizontal direction, and long sides of the first separator 28 and the second separator 30 may extend in the direction of gravity.

At one end of the fuel cell 12 in the longitudinal direction indicated by the arrow A, an oxygen-containing gas supply passage (fluid passage) 32a and a fuel gas supply passage (fluid passage) 34a are provided. The oxygen-containing gas supply passage 32a and the fuel gas supply passage 34a extend through the fuel cell 12 in the direction indicated by the arrow B. The opening of the oxygen-containing gas supply passage 32a for supplying an oxygen-containing gas has a rectangular shape (or triangular shape). The opening of the fuel gas supply passage 34a for supplying a fuel gas such as a hydrogen-containing gas has a rectangular shape (or triangular shape).

At the other end of the fuel cell 12 in the longitudinal direction, a fuel gas discharge passage (fluid passage) 34b and an oxygen-containing gas discharge passage (fluid passage) 32b are provided. The fuel gas discharge passage 34b and the oxygen-containing gas discharge passage 32b extend through the fuel cell 12 in the direction indicated by the arrow B. The opening of the fuel gas discharge passage 34b for discharging the fuel gas has a rectangular shape (or triangular shape). The opening of the oxygen-containing gas discharge passage 32b for discharging the oxygen-containing gas has a rectangular shape (or triangular shape).

Two coolant supply passages (fluid passage) 36a for supplying a coolant are provided oppositely on both sides of the fuel cell 12 in the short-side direction indicated by the arrow C, adjacent to one of both ends in the horizontal direction, i.e., adjacent to the oxygen-containing gas supply passage 32a and the fuel gas supply passage 34a. The openings of the coolant supply passages 36a for supplying the coolant have a rectangular shape (or triangular shape). The coolant supply passages 36a extend through the fuel cell 12 in the direction indicated by the arrow B. The coolant supply passages 36a are provided at upper and lower positions on opposite sides.

Two coolant discharge passages (fluid passage) 36b for discharging a coolant are provided oppositely on both sides of the fuel cell 12 in the short-side direction, adjacent to the other of both ends in the horizontal direction, i.e., adjacent to the fuel gas discharge passage 34b and the oxygen-containing gas discharge passage 32b. The openings of the coolant discharge passages 36b for discharging the coolant have a rectangular shape (or triangular shape). The coolant discharge passages 36b extend through the fuel cell 12 in the direction indicated by the arrow B. The coolant discharge passages 36b are provided at upper and lower positions on opposite sides.

The membrane electrode assembly 26 includes a solid polymer electrolyte membrane 38, and a cathode (electrode) 40 and an anode (electrode) 42 sandwiching the solid polymer electrolyte membrane 38. The solid polymer electrolyte membrane 38 is formed by impregnating a thin membrane of perfluorosulfonic acid with water, for example.

Each of the cathode 40 and the anode 42 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 40 and the electrode catalyst layer of the anode 42 are fixed to both surfaces of the solid polymer electrolyte membrane 38, respectively.

The first separator 28 has an oxygen-containing gas flow field 44 on its surface 28a facing the membrane electrode assembly 26. The oxygen-containing gas flow field 44 is connected to the oxygen-containing gas supply passage 32a and the oxygen-containing gas discharge passage 32b. The oxygen-containing gas flow field 44 includes a plurality of wavy flow grooves (or straight flow grooves) extending in the direction indicated by the arrow A.

The second separator 30 has a fuel gas flow field 46 on its surface 30a facing the membrane electrode assembly 26. The fuel gas flow field 46 is connected to the fuel gas supply passage 34a and the fuel gas discharge passage 34b. The fuel gas flow field 46 includes a plurality of wavy flow grooves (or straight flow grooves) extending in the direction indicated by the arrow A.

A coolant flow field 48 is formed between a surface 30b of the second separator 30 and a surface 28b of the adjacent first separator 28. The coolant flow field 48 is connected to the coolant supply passages 36a and the coolant discharge passages 36b. The coolant flow field 48 extends in a horizontal direction for allowing the coolant to flow over the electrode area of the membrane electrode assembly 26.

A first seal member 50 is formed integrally with the surfaces 28a, 28b of the first separator 28, around the outer circumferential end of the first separator 28. A second seal member 52 is formed integrally with the surfaces 30a, 30b of the second separator 30, around the outer circumferential end of the second separator 30.

Each of the first seal member 50 and the second seal member 52 is an elastic seal member which is made of seal material, cushion material, or packing material such as an EPDM rubber (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 1, an oxygen-containing gas supply connection pipe 54a, an oxygen-containing gas discharge connection pipe 54b, a fuel gas supply connection pipe 56a, and a fuel gas discharge connection pipe 56b are attached to the first end plate 18a. The oxygen-containing gas supply connection pipe 54a is connected to the oxygen-containing gas supply passage 32a, the oxygen-containing gas discharge connection pipe 54b is connected to the oxygen-containing gas discharge passage 32b, the fuel gas supply connection pipe 56a is connected to the fuel gas supply passage 34a, and the fuel gas discharge connection pipe 56b is connected to the fuel gas discharge passage 34b.

The oxygen-containing gas supply connection pipe 54a includes an attachment plate 58, and the attachment plate 58 is provided at the oxygen-containing gas supply passage 32a of the first end plate 18a through a seal 60. The attachment plate 58 is fixed to the first end plate 18a using screws 62. A body portion 64 is formed integrally with the attachment plate 58, and a circular oxygen-containing gas inlet (fluid inlet) 66 is formed at a front end of the body portion 64.

Figure 4:
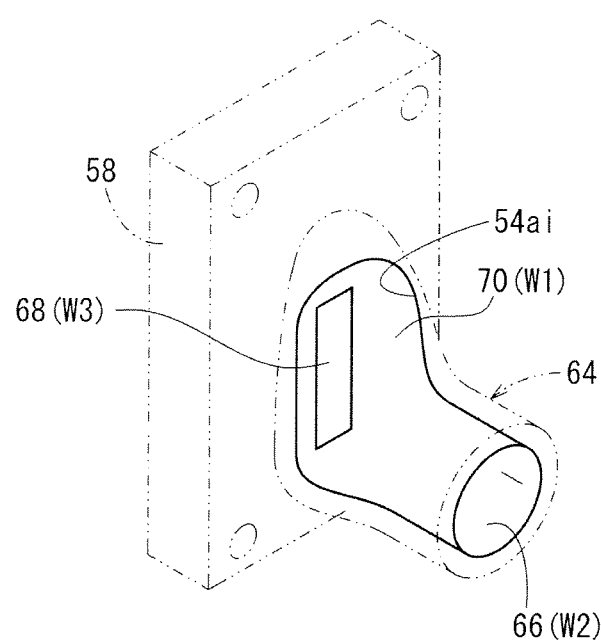
FIG. 4 is a perspective view showing the inside of an oxygen-containing gas supply connection pipe of the fuel cell stack.

As shown in FIG. 4, a rectangular (or triangular) oxygen-containing gas outlet (fluid outlet) 68 connected to the oxygen-containing gas supply passage 32a is formed in the attachment plate 58. The oxygen-containing gas supply connection pipe 54a has an intermediate pipe portion 70 between the oxygen-containing gas inlet 66 and the oxygen-containing gas outlet 68.

Figure 5:
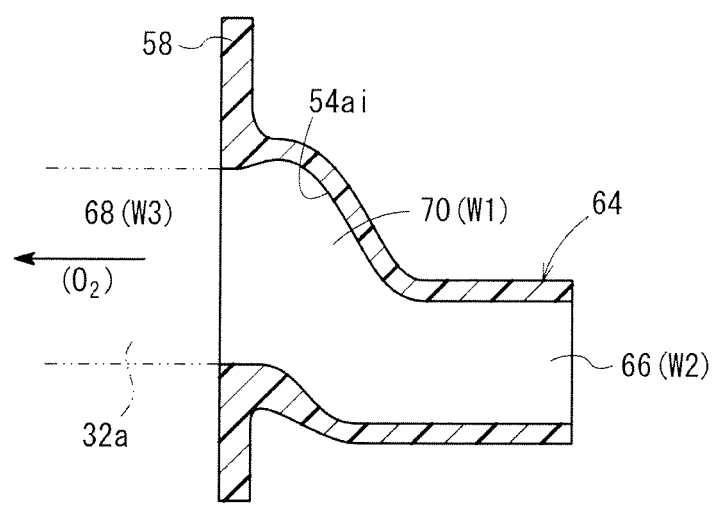
FIG. 5 is a cross sectional view showing the oxygen-containing gas connection pipe.

As shown in FIGS. 4 and 5, the opening cross sectional area W1 of the intermediate pipe portion 70 is larger than the opening cross sectional area W2 of the oxygen-containing gas inlet 66 and the opening cross sectional area W3 of the oxygen-containing gas outlet 68 (W1>W2, W1>W3).

The oxygen-containing gas supply connection pipe 54a has a smoothened inner wall surface 54ai over an area from the oxygen-containing gas inlet 66 to the intermediate pipe portion 70, and over an area from the oxygen-containing gas outlet 68 to the intermediate pipe portion 70. The inner wall surface 54ai of the oxygen-containing gas supply connection pipe 54a is smooth and continuous as a whole, and only includes an outward-curved surface which is curved outward in the pipe length direction. That is, the inner wall surface 54ai of the oxygen-containing gas supply connection pipe 54a does not include any portion (reduced portion) which is curved or bent inward.

The oxygen-containing gas discharge connection pipe 54b has the same structure as the oxygen-containing gas supply connection pipe 54a. The constituent elements of the oxygen-containing gas discharge connection pipe 54b that are identical to those of the oxygen-containing gas supply connection pipe 54a are labeled with the same reference numerals, and description thereof will be omitted. The oxygen-containing gas supply connection pipe 54a and the oxygen-containing gas discharge connection pipe 54b are connected to external devices (not shown) through external pipes.

As shown in FIG. 1, the fuel gas supply connection pipe 56a includes an attachment plate 72, and the attachment plate 72 is provided at the fuel gas supply passage 34a of the first end plate 18a through a seal 74. The attachment plate 72 is fixed to the first end plate 18a using screws 76. A body portion 78 is formed integrally with the attachment plate 72, and a circular fuel gas inlet (fluid inlet) 80 is formed at a front end of the body portion 78. The body portion 78 is formed to have a curve at an angle of substantially 90°. That is, the fuel gas flow direction at the fuel gas inlet 80 is perpendicular to the fuel gas flow direction in the fuel gas supply passage 34a.

Figure 6:
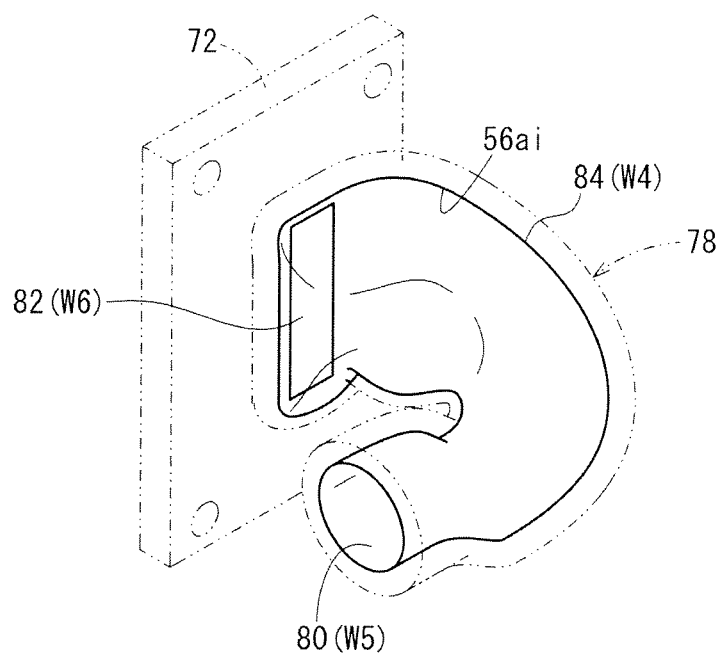
FIG. 6 is a perspective view showing the inside of a fuel gas supply connection pipe of the fuel cell stack.

As shown in FIG. 6, a rectangular (or triangular) fuel gas outlet (fluid outlet) 82 connected to the fuel gas supply passage 34a is formed in the attachment plate 72. The fuel gas supply connection pipe 56a has an intermediate pipe portion 84 between the fuel gas inlet 80 and the fuel gas outlet 82.

Figure 7:
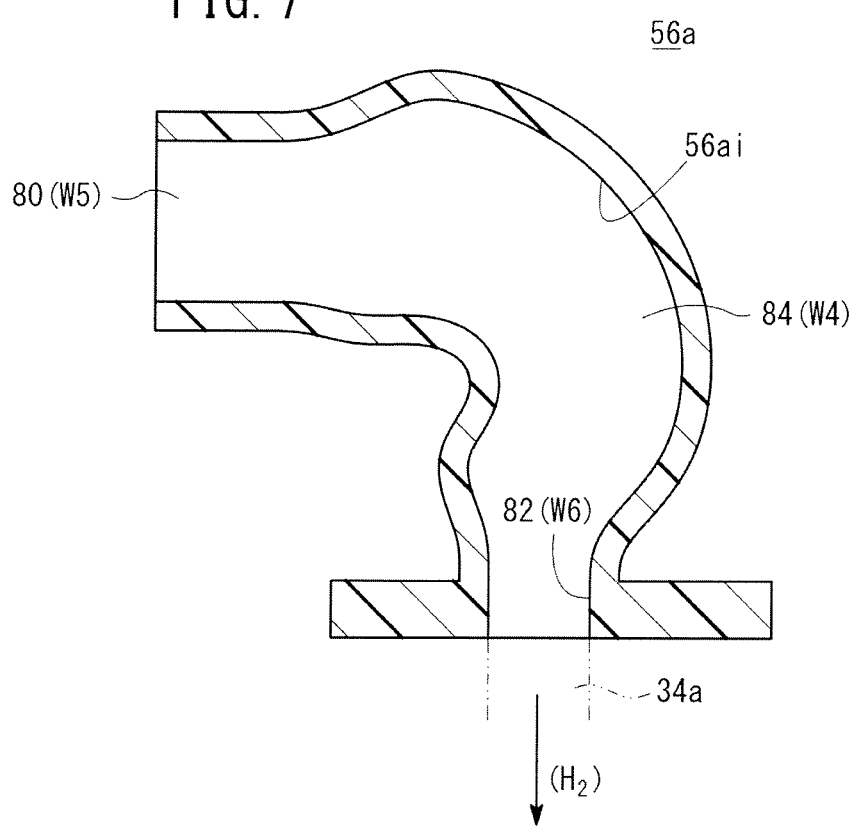
FIG. 7 is a cross sectional view showing the fuel gas supply connection pipe.

As shown in FIGS. 6 and 7, the opening cross sectional area W4 of the intermediate pipe portion 84 is larger than the opening cross sectional area W5 of the fuel gas inlet 80 and the opening cross sectional area W6 of the fuel gas outlet 82 (W4>W5, W4>W6).

The fuel gas supply connection pipe 56a has a smoothened inner wall surface 56ai over an area from the fuel gas inlet 80 to the intermediate pipe portion 84, and over an area from the fuel gas outlet 82 to the intermediate pipe portion 84. The inner wall surface 56ai of the fuel gas supply connection pipe 56a is smooth and continuous as a whole, and only includes an outward-curved surface which is curved outward in the pipe length direction. That is, the inner wall surface 56ai of the fuel gas supply connection pipe 56a does not include any portion (reduced portion) which is curved or bent inward.

The fuel gas discharge connection pipe 56b has the same structure as the fuel gas supply connection pipe 56a. The constituent elements of the fuel gas discharge connection pipe 56b that are identical to those of the fuel gas supply connection pipe 56a are labeled with the same reference numerals, and description thereof will be omitted. The fuel gas supply connection pipe 56a and the fuel gas discharge connection pipe 56b are connected to external devices (not shown) through external pipes.

As shown in FIG. 2, a coolant supply connection pipe 86a and a coolant discharge connection pipe 86b are attached to the second end plate 18b. The coolant supply connection pipe 86a is connected to both of the upper and lower coolant supply passages 36a, and the coolant discharge connection pipe 86b is connected to both of the upper and lower coolant discharge passages 36b.

The coolant supply connection pipe 86a includes a pair of attachment plates 88, and the attachment plates 88 are provided at the respective coolant supply passages 36a of the second end plate 18b through seals 90. The attachment plates 88 are fixed to the second end plate 18b using screws 92. A body portion 94 is formed integrally with the attachment plates 88, and a curved pipe portion 96 is formed integrally with a central portion of the body portion 94. A circular coolant inlet (fluid inlet) 98 is formed at a front end of the pipe portion 96.

Figure 8:
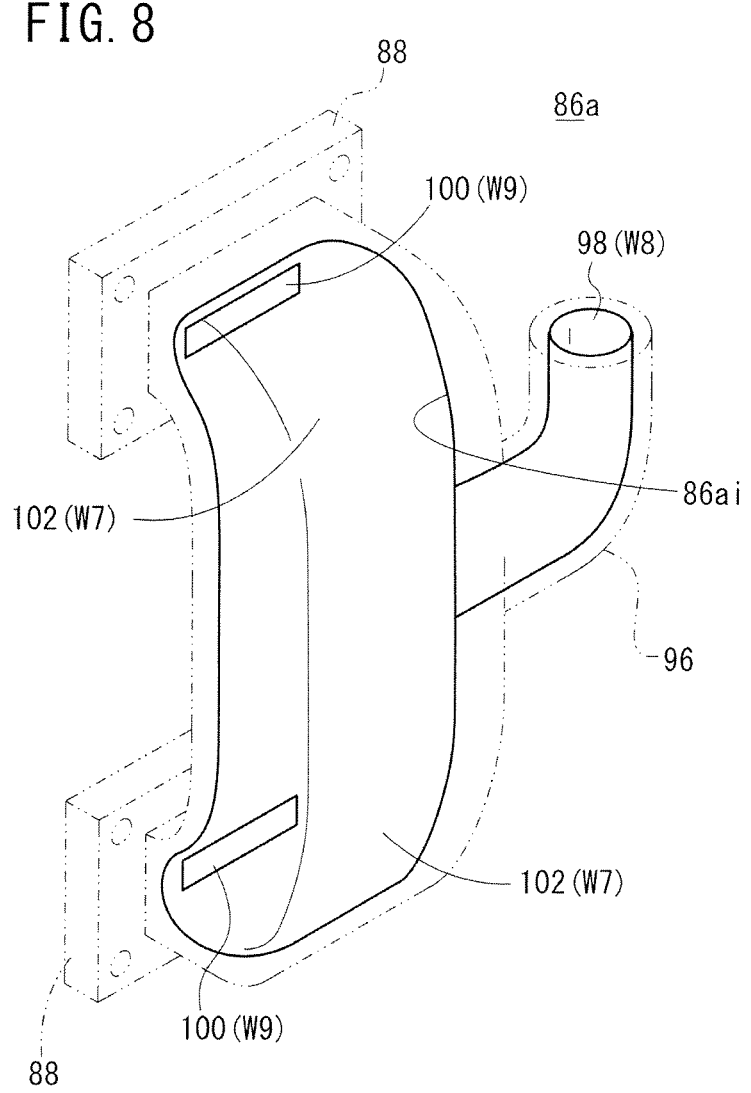
FIG. 8 is a perspective view showing the inside of a coolant supply connection pipe of the fuel cell stack.

As shown in FIG. 8, a rectangular (or triangular) coolant outlet (fluid outlet) 100 connected to the coolant supply passage 36a is formed in each of the attachment plates 88.

The coolant supply connection pipe 86a includes a pair of intermediate pipe portions 102 between the coolant inlet 98 and the coolant outlets 100.

The total opening cross sectional area 2×W7 of the intermediate pipe portions 102 calculated by summing the opening cross sectional areas W7 of the intermediate pipe portions 102 is larger than the opening cross sectional area W8 of the coolant inlet 98, and larger than the total opening cross sectional area 2×W9 of the coolant outlets 100 calculated by summing the opening cross sectional areas W9 of the coolant outlets 100 (2×W7>W8, 2×W7>2×W9).

The coolant supply connection pipe 86a has a smoothened inner wall surface 86ai over an area from the coolant inlet 98 to the intermediate pipe portion 102, and over an area from each of the coolant outlets 100 to the intermediate pipe portion 102. The inner wall surface 86ai of the coolant supply connection pipe 86a is smooth and continuous as a whole, and only includes an outward curved surface which is curved outward in the pipe length direction. That is, the inner wall surface 86ai of the coolant supply connection pipe 86a does not include any portion which is curved or bent inward.

The coolant discharge connection pipe 86b has the same structure as the coolant supply connection pipe 86a. The constituent elements of the coolant discharge connection pipe 86b that are identical to those of the coolant supply connection pipe 86a are labeled with the same reference numerals, and description thereof will be omitted. The coolant supply connection pipe 86a and the coolant discharge connection pipe 86b are connected to external devices (not shown) through external pipes.

Operation of the fuel cell stack 10 will be described below.

Firstly, as shown in FIG. 1, an oxygen-containing gas from the oxygen-containing gas supply connection pipe 54a connected to the first end plate 18a is supplied to the oxygen-containing gas supply passage 32a, and a fuel gas such as a hydrogen-containing gas from the fuel gas supply connection pipe 56a connected to the first end plate 18a is supplied to the fuel gas supply passage 34a.

Further, as shown in FIG. 2, a coolant such as pure water, ethylene glycol, oil, or the like from the coolant supply connection pipe 86a connected to the second end plate 18b is supplied to the pair of coolant supply passages 36a.

Thus, as shown in FIG. 3, the oxygen-containing gas flows from the oxygen-containing gas supply passage 32a into the oxygen-containing gas flow field 44 of the first separator 28. The oxygen-containing gas flows along the oxygen-containing gas flow field 44 in the direction indicated by the arrow A, and the oxygen-containing gas is supplied to the cathode 40 of the membrane electrode assembly 26 for inducing an electrochemical reaction at the cathode 40.

In the meanwhile, the fuel gas is supplied from the fuel gas supply passage 34a to the fuel gas flow field 46 of the second separator 30. The fuel gas flows along the fuel gas flow field 46 in the direction indicated by the arrow A, and the fuel gas is supplied to the anode 42 of the membrane electrode assembly 26 for inducing an electrochemical reaction at the anode 42.

Thus, in each of the membrane electrode assemblies 26 the oxygen-containing gas supplied to the cathode 40, and the fuel gas supplied to the anode 42 are consumed in the electrochemical reactions at catalyst layers of the cathode 40 and the anode 42 for generating electricity.

Then, the oxygen-containing gas consumed at the cathode 40 of the membrane electrode assembly 26 flows along the oxygen-containing gas discharge passage 32b in the direction indicated by the arrow B, and the oxygen-containing gas is discharged from the oxygen-containing gas discharge connection pipe 54b (see FIG. 1). The fuel gas consumed at the anode 42 of the membrane electrode assembly 26 flows along the fuel gas discharge passage 34b in the direction indicated by the arrow B, and the fuel gas is discharged from the fuel gas discharge connection pipe 56b.

Further, the coolant supplied to the pair of coolant supply passages 36a flows into the coolant flow field 48 between the first separator 28 and the second separator 30. After the coolant flows temporarily inward in the direction indicated by the arrow C, the coolant moves in the direction indicated by the arrow A for cooling the membrane electrode assembly 26. After the coolant flows outward in the direction indicated by the arrow C, the coolant flows along the pair of coolant discharge passages 36b in the direction indicated by the arrow B, and the coolant is discharged from the coolant discharge connection pipe 86b (see FIG. 2).

In the first embodiment, as shown in FIGS. 4 and 5, in the oxygen-containing gas supply connection pipe 54a, the opening cross sectional area W1 of the intermediate pipe portion 70 is larger than the opening cross sectional area W2 of the oxygen-containing gas inlet 66 and the opening cross sectional area W3 of the oxygen-containing gas outlet 68 (W1>W2, W1>W3).

Thus, in the oxygen-containing gas supply connection pipe 54a, the pressure loss of the oxygen-containing gas is suppressed as much as possible. Therefore, the oxygen-containing gas can flow from the external pipe to the oxygen-containing gas supply passage 32a through the oxygen-containing gas supply connection pipe 54a smoothly and reliably.

Figure 9:
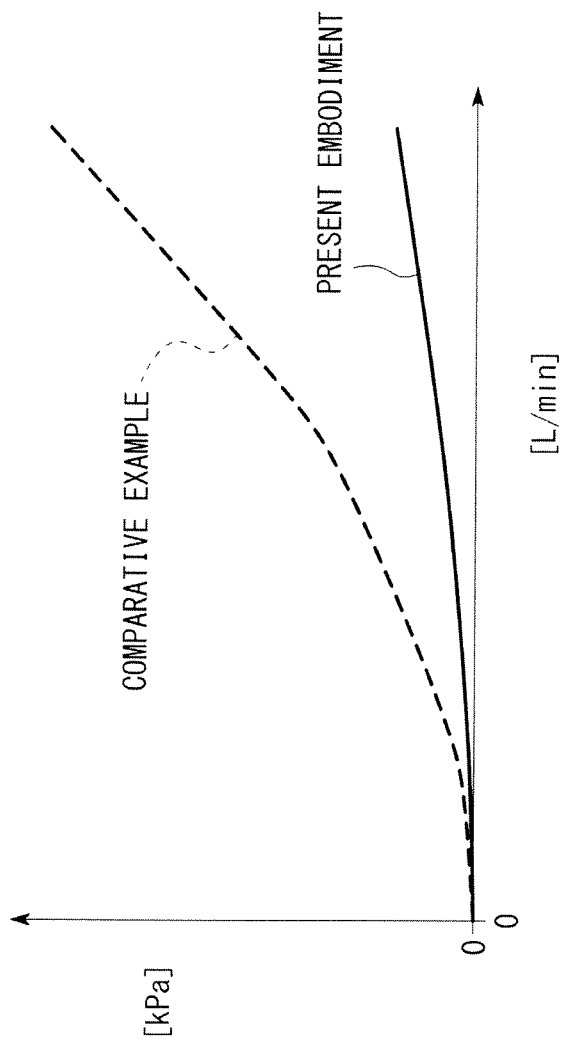
FIG. 9 is a graph showing comparison of the pressure loss between the first embodiment and a comparative example.

In this regard, an experiment for comparison of the pressure loss between an oxygen-containing gas supply connection pipe according to a comparative example and the oxygen-containing gas supply connection pipe 54a according to the present embodiment was conducted. In the oxygen-containing gas supply connection channel according to the comparative example, the opening cross sectional area of an intermediate pipe portion 70 and the opening cross sectional area of the oxygen-containing gas inlet 66 have the same value, and the shape of the opening of the intermediate pipe portion 70 in cross section is different from the shape of the opening of the oxygen-containing gas inlet 66 in cross section. The result is shown in FIG. 9.

In the comparative example, as the pipe length becomes longer, the internal pressure loss is increased rapidly. In contrast, in the present embodiment, increase in the pressure loss is suppressed suitably. It should be noted that the same result was obtained also in the fuel gas supply connection pipe 56a and the coolant supply connection pipe 86a as described later.

Further, in the first embodiment, as shown in FIGS. 6 and 7, in the fuel gas supply connection pipe 56a, the opening cross sectional area W4 of the intermediate pipe portion 84 is larger than the opening cross sectional area W5 of the fuel gas inlet 80 and the opening cross sectional area W6 of the fuel gas outlet 82 (W4>W5, W4>W6).

Therefore, in the fuel gas supply connection pipe 56a, the pressure loss of the fuel gas is suppressed as much as possible. Thus, the fuel gas can flow from the external pipe to the fuel gas supply passage 34a through the fuel gas supply connection pipe 56a smoothly and reliably. In particular, in the fuel gas supply connection pipe 56a, even if the body portion 78 is curved at an angle of substantially 90°, the fuel gas flows suitably without any increase in the internal pressure loss.

Further, in the first embodiment, as shown in FIG. 8, in the coolant supply connection pipe 86a, the total opening cross sectional area 2×W7 of the intermediate pipe portions 102 is larger than the opening cross sectional area W8 of the coolant inlet 98, and larger than the total opening cross sectional area 2×W9 of the coolant outlets 100 (2×W7>W8, 2×W7>2×W9).

Therefore, in the coolant supply connection pipe 86a, the pressure loss of the coolant is suppressed as much as possible. Thus, the coolant can flow from the external pipe to the coolant supply passages 36a through the coolant supply connection pipe 86a smoothly and reliably.

Figure 10:
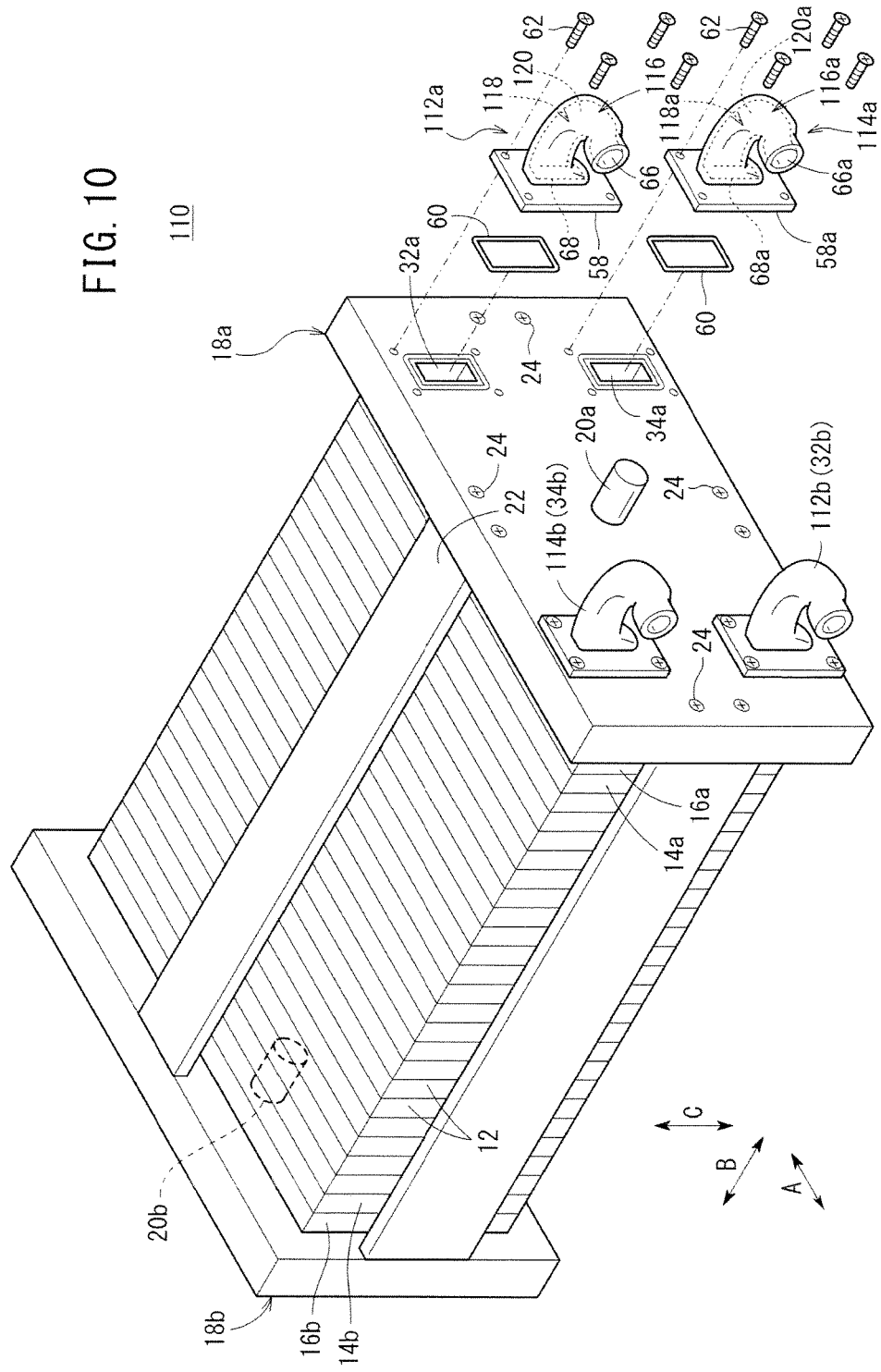
FIG. 10 is a perspective view schematically showing a fuel cell stack according to a second embodiment of the present invention.

As shown in FIG. 10, a fuel cell stack 110 according to a second embodiment of the present invention is formed by stacking a plurality of fuel cells 12. The constituent elements of the fuel cell stack 110 that are identical to those of the fuel cell stack 10 according to the first embodiment are labeled with the same reference numerals, and description thereof will be omitted.

An oxygen-containing gas supply connection pipe 112a, an oxygen-containing gas discharge connection pipe 112b, a fuel gas supply connection pipe 114a, and a fuel gas discharge connection pipe 114b are attached to the first end plate 18a. The oxygen-containing gas supply connection pipe 112a is connected to the oxygen-containing gas supply passage 32a, the oxygen-containing gas discharge connection pipe 112b is connected to the oxygen-containing gas discharge passage 32b, the fuel gas supply connection pipe 114a is connected to the fuel gas supply passage 34a, and the fuel gas discharge connection pipe 114b is connected to the fuel gas discharge passage 34b.

The oxygen-containing gas supply connection pipe 112a includes an attachment plate 58, and the attachment plate 58 is provided at the oxygen-containing gas supply passage 32a of the first end plate 18a through a seal 60. A body portion 116 is formed integrally with the attachment plate 58, and a circular oxygen-containing gas inlet (fluid inlet) 66 is formed at a front end of the body portion 116.

Figure 11:
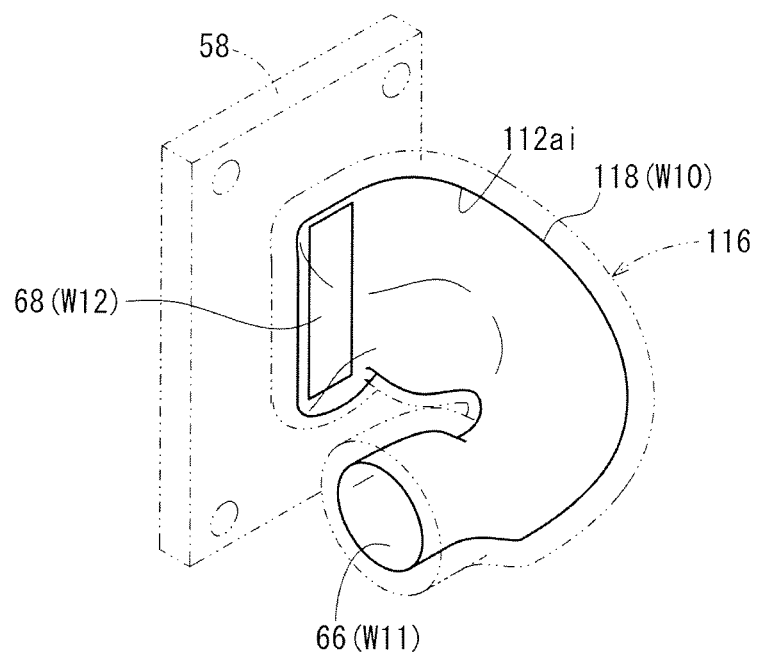
FIG. 11 is a perspective view showing the inside of an oxygen-containing gas supply connection pipe of the fuel cell stack.
Figure 12:
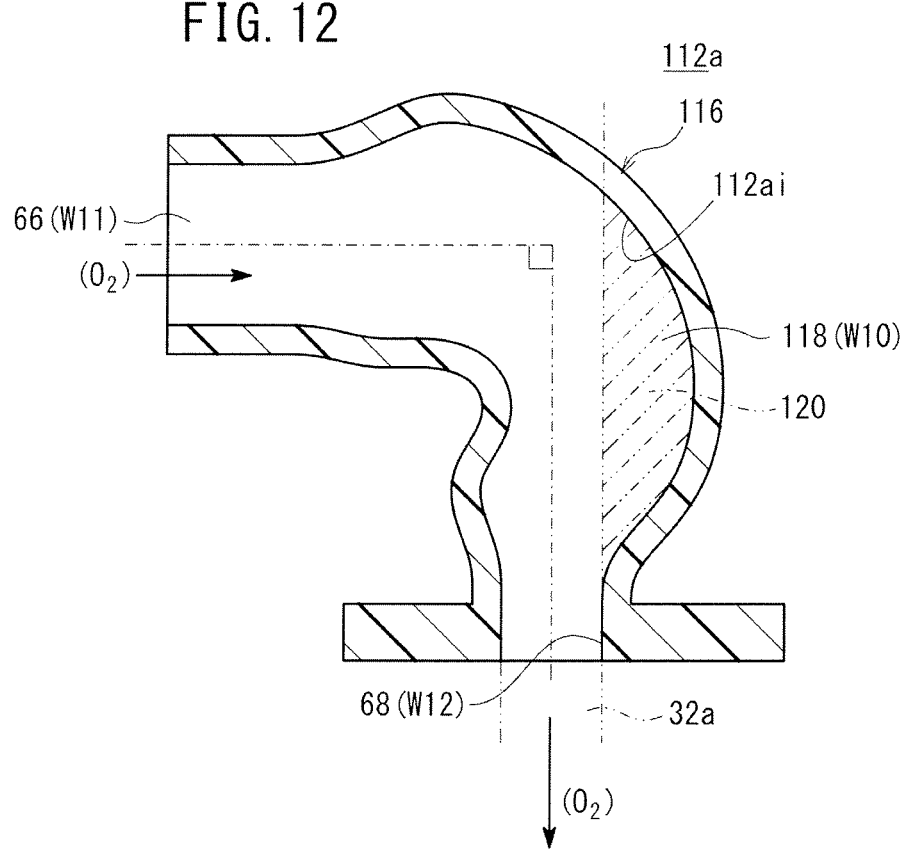
FIG. 12 is a cross sectional view showing the oxygen-containing gas supply connection pipe.

As shown in FIGS. 10 and 11, the attachment plate 58 has a rectangular (or triangular) oxygen-containing gas outlet (fluid outlet) 68 connected to the oxygen-containing gas supply passage 32a. The oxygen-containing gas supply connection pipe 112a has an intermediate pipe portion 118 between the oxygen-containing gas inlet 66 and the oxygen-containing gas outlet 68. The intermediate pipe portion 118 is curved at an angle of substantially 90°. As shown in FIG. 12, the flow direction of the oxygen-containing gas at the oxygen-containing gas inlet 66 is perpendicular to the flow direction of the oxygen-containing gas in the oxygen-containing gas supply passage 32a.

As shown in FIGS. 11 and 12, the opening cross sectional area W10 of the intermediate pipe portion 118 is larger than the opening cross sectional area W11 of the oxygen-containing gas inlet 66 and the opening cross sectional area W12 of the oxygen-containing gas outlet 68 (W10>W11, W10>W12). As shown in FIG. 12, the intermediate pipe portion 118 includes an expanded portion 120 expanded toward the opposite side of the oxygen-containing gas inlet 66 from an opening area of the oxygen-containing gas outlet 68 in a front view.

The oxygen-containing gas supply connection pipe 112a has a smoothened inner wall surface 112ai over an area from the oxygen-containing gas inlet 66 to the intermediate pipe portion 118, and over an area from the oxygen-containing gas outlet 68 to the intermediate pipe portion 118. The inner wall surface 112*ai* of the oxygen-containing gas supply connection pipe 112*a* is smooth and continuous as a whole, and only includes an outward-curved surface which is curved outward in the pipe length direction. That is, the inner wall surface 112*ai* of the oxygen-containing gas supply connection pipe 112*a* does not include any portion (reduced portion) which is curved or bent inward.

The oxygen-containing gas discharge connection pipe 112*b* has the same structure as the oxygen-containing gas supply connection pipe 112*a*. The constituent elements of the oxygen-containing gas discharge connection pipe 112*b* that are identical to those of the oxygen-containing gas supply connection pipe 112*a* are labeled with the same reference numerals, and description thereof will be omitted. The oxygen-containing gas supply connection pipe 112*a* and the oxygen-containing gas discharge connection pipe 112*b* are connected to external devices (not shown) such as a humidifier through external pipes (not shown).

As shown in FIG. 10, the fuel gas supply connection pipe 114*a* and the fuel gas discharge connection pipe 114*b* have the same structure as the oxygen-containing gas supply connection pipe 112*a*. The constituent elements of the fuel gas supply connection pipe 114*a* and the fuel gas discharge connection pipe 114*b* that are identical to those of the oxygen-containing gas supply connection pipe 112*a* are labeled with the same reference numerals with the suffix "a", and description thereof will be omitted. The fuel gas supply connection pipe 114*a* and the fuel gas discharge connection pipe 114*b* are connected to external devices (not shown) through external pipes (not shown)

In the second embodiment, as shown in FIGS. 11 and 12, in the oxygen-containing gas supply connection pipe 112*a*, the opening cross sectional area W10 of the intermediate pipe portion 118 is larger than the opening cross sectional area W12 of the oxygen-containing gas outlet 68 (W10>W12). Further, as shown in FIG. 12, the intermediate pipe portion 118 includes the expanded portion 120 expanded toward the opposite side of the oxygen-containing gas inlet 66 from the opening area of the oxygen-containing gas outlet 68 in the front view.

Therefore, in the oxygen-containing gas supply connection pipe 112*a*, the pressure loss of the oxygen-containing gas is suppressed as much as possible. Therefore, the oxygen-containing gas can flow from an external pipe (not shown) to the oxygen-containing gas supply passage 32*a* through the oxygen-containing gas supply connection pipe 112*a* smoothly and uniformly.

Further, the oxygen-containing gas supply connection pipe 112*a* is curved at its intermediate position at an angle of substantially 90°. Therefore, it becomes possible to determine the layout of the piping structure more freely, and the fuel cell stack 10 can be constructed compactly in the stacking direction of the fuel cell stack 10. Also in the fuel gas supply connection pipe 114*a*, the same advantages are obtained.

Figure 13:
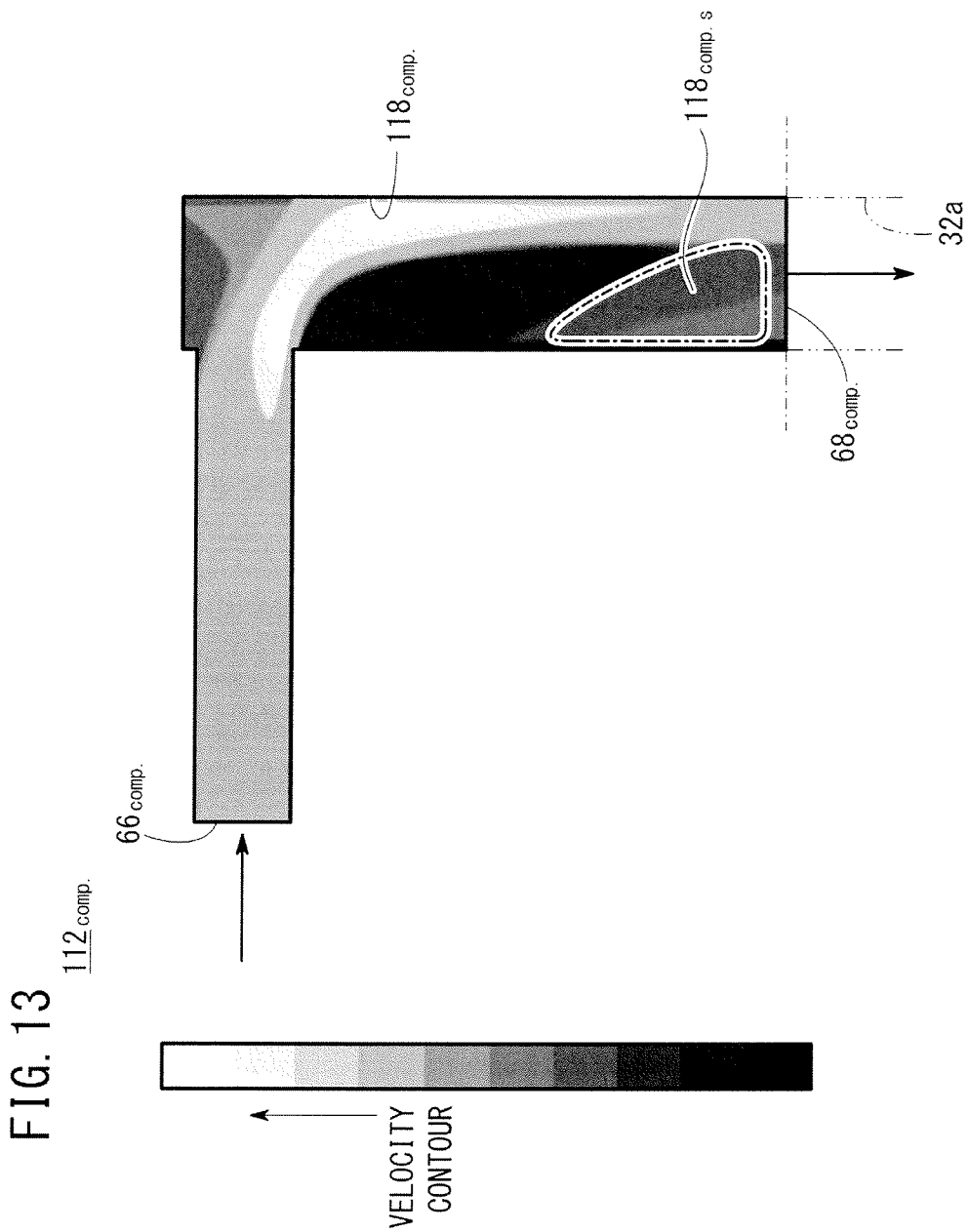
FIG. 13 is a graph showing a velocity contour map inside an oxygen-containing gas supply connection pipe according to the comparative example.

In this regard, as shown in FIG. 13, as a comparative example, an oxygen-containing gas supply connection pipe 112comp. was prepared. The oxygen-containing gas supply connection pipe 112comp. includes an oxygen-containing gas inlet 66comp., an oxygen-containing gas outlet 68comp., and an intermediate pipe portion 118comp. The opening cross sectional area of the intermediate pipe portion 118comp. is the same as the opening cross sectional area of the oxygen-containing gas outlet 68comp. The intermediate pipe portion 118comp. is curved at an angle of substantially 90°, and does not have the expanded portion 120 according to the second embodiment.

An experiment for detecting the flow velocity and the pressure in the pipe was conducted using the oxygen-containing gas supply connection pipe 112comp. according to the comparative example and the oxygen-containing gas supply connection pipe 112*a* according to the second embodiment. As a result, in the oxygen-containing gas supply connection pipe 112comp., as can be seen from a velocity contour map of FIG. 13, in a part of the oxygen-containing gas supply connection pipe 112comp., large change in the flow velocity occurred. In particular, a spiral area 118comp.s was formed in an area adjacent to the oxygen-containing gas outlet 68comp. Therefore, it is not possible to supply the oxygen-containing gas uniformly to the oxygen-containing gas supply passage 32*a*.

Figure 14:
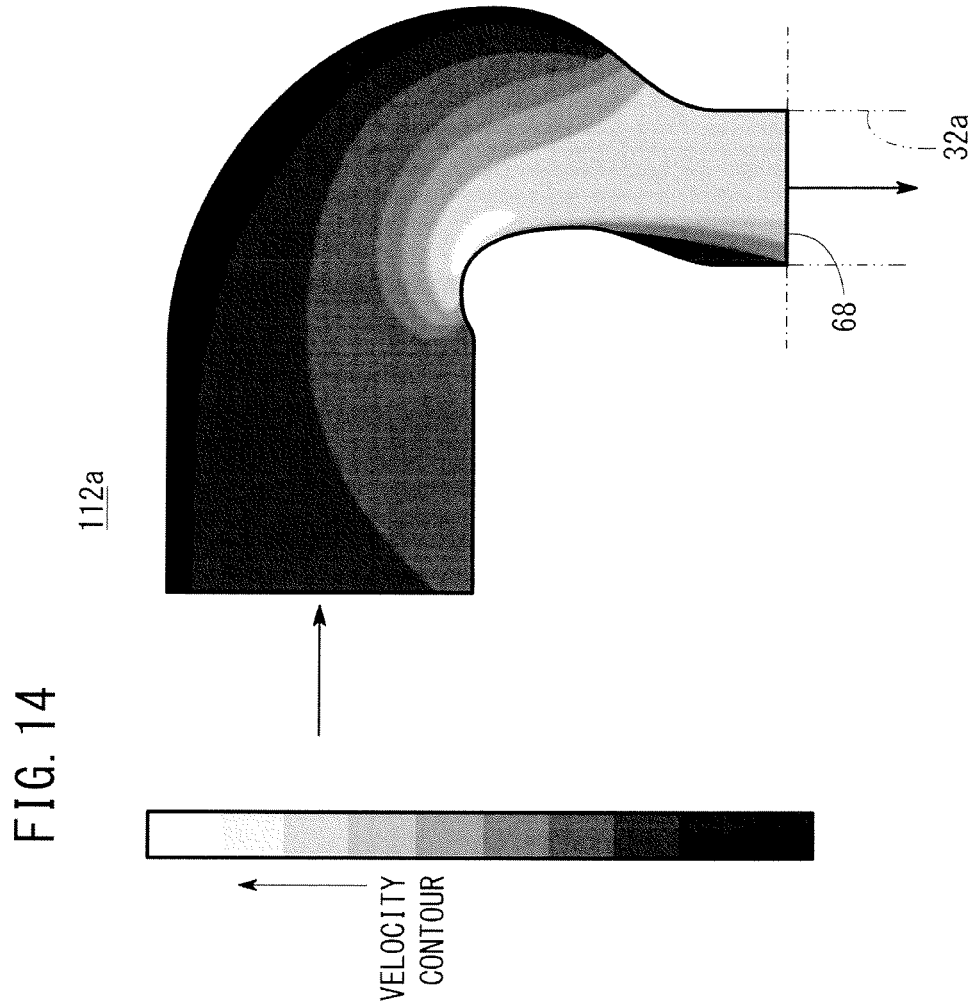
FIG. 14 is a graph showing a velocity contour map inside the oxygen-containing gas supply connection pipe according to the second embodiment.

In contrast, in the second embodiment, as shown in a velocity contour map of FIG. 14, the flow velocity in an area adjacent to the oxygen-containing gas outlet 68 was uniform. Therefore, it is possible to supply the oxygen-containing gas uniformly and reliably to the oxygen-containing gas supply passage 32*a*.

Figure 15:
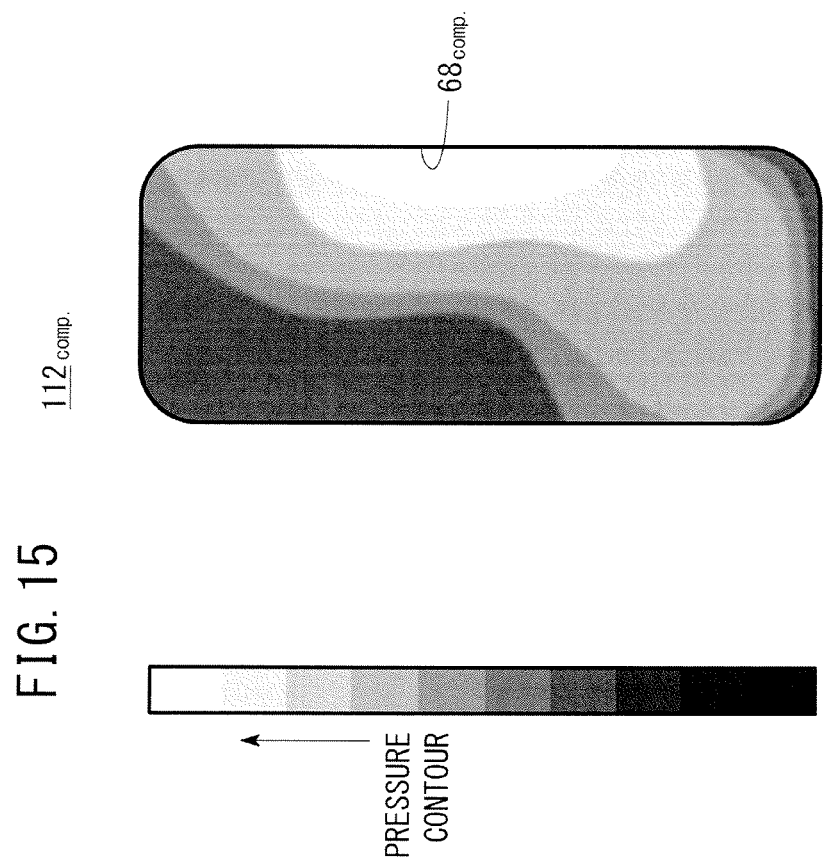
FIG. 15 is a graph showing a pressure contour map of an area adjacent to an oxygen-containing gas outlet according to the comparative example.
Figure 16:
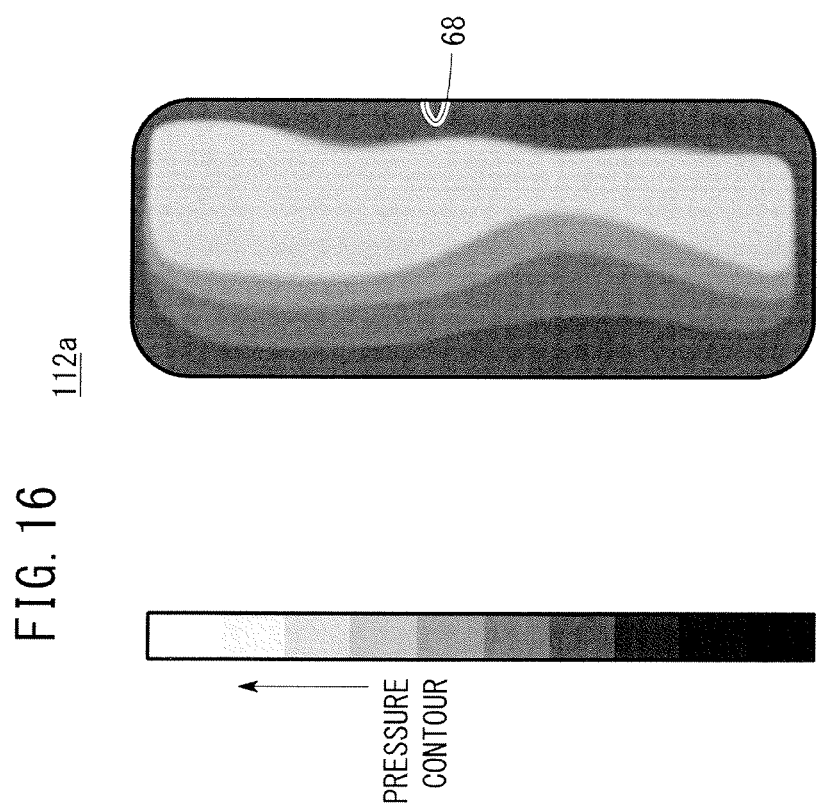
FIG. 16 is a graph showing a pressure contour map of an area adjacent to the oxygen-containing gas outlet according to the second embodiment.
Figure 17:
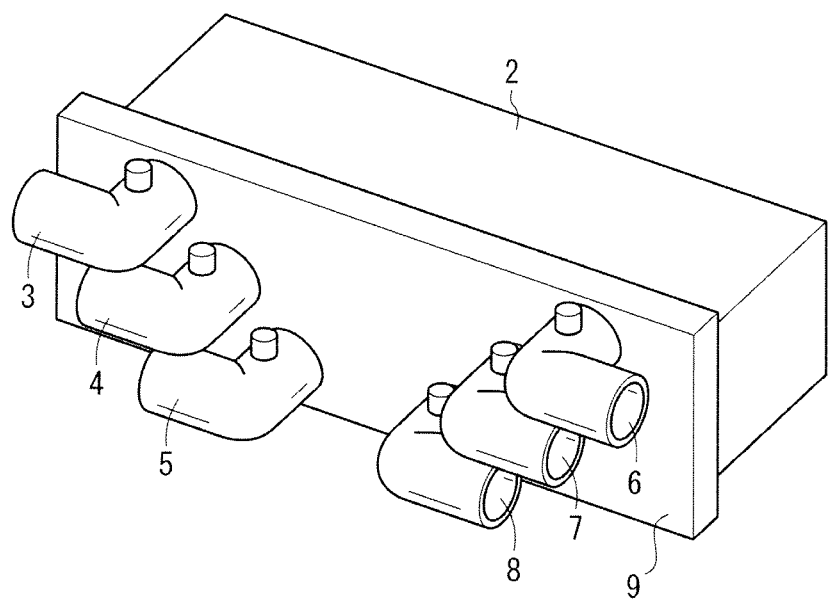
FIG. 17 is a perspective view showing piping structure according to a conventional technique 2.

Further, in the oxygen-containing gas supply connection pipe 112comp., as can be seen from a pressure contour map of FIG. 15, significantly non-uniform pressure distribution was present in an area adjacent to the oxygen-containing gas outlet 68comp. In contrast, in the second embodiment, as can be seen from a pressure contour map in FIG. 16, uniform pressure distribution was obtained in an area adjacent to the oxygen-containing gas outlet 68. Therefore, it is possible to supply the oxygen-containing gas suitably to the oxygen-containing gas supply passage 32*a*.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack formed by stacking a plurality of fuel cells in a stacking direction, the fuel cells each being formed by stacking a membrane electrode assembly and a separator together, the membrane electrode assembly including a pair of electrodes and an electrolyte membrane interposed between the electrodes, end plates being provided at both ends in the stacking direction of the fuel cells, a fluid passage extending through the fuel cells in the stacking direction for allowing at least one of reactant gases or a coolant to flow through the fluid passage, a connection pipe connecting the fluid passage and an external pipe being connected to at least one of the end plates, wherein the connection pipe integrally has one fluid inlet, only two intermediate pipe portions branched from the one fluid inlet at a branching point, and only two fluid outlets respectively provided for the two intermediate pipe portions, wherein a total intermediate opening cross sectional area that is a sum of cross sectional areas of the two intermediate pipe portions is larger than an inlet opening cross sectional area of the one fluid inlet, the intermediate opening cross sectional area of the intermediate pipe portion being an area perpendicular to a flow direction of the fluid flowing through the intermediate pipe portion; and the inlet opening cross sectional area of the one fluid inlet being an area perpendicular to a flow direction of the fluid flowing through the one fluid inlet, wherein the total intermediate opening cross sectional area is larger than a total outlet opening cross sectional area that is a sum of cross sectional areas of the two fluid outlets; the outlet opening cross sectional area of the fluid outlet being an area perpendicular to a flow direction of the fluid flowing through the fluid outlet, wherein said connection pipe has an inner wall surface over an area from the one fluid inlet to each of the intermediate pipe portions, and over an area from each of the two fluid outlets to each of respective said intermediate pipe portions, and wherein the inner wall surface of the connection pipe is smooth and continuous as a whole, and includes an outward curved surface which is curved outward in a length direction from the one fluid inlet towards a mid portion of the connection pipe, and also from each of fluid outlets towards the mid portion of the connection pipe.

2. The fuel cell stack according to claim 1, wherein the branching point is positioned between the two fluid outlets.

3. The fuel cell stack according to claim 1, wherein the two fluid outlets are spaced vertically from each other in a direction intersecting with the stacking direction of the fuel cells when the fuel cell stack is installed in a vehicle.

4. The fuel cell stack according to claim 1, wherein a cross-sectional shape of the one fluid inlet is different from a cross-sectional shape of the two fluid outlets, and an opening cross-sectional shape of the connection pipe is formed so as to change smoothly from the one fluid inlet to the two fluid outlets.

5. The fuel cell stack according to claim 1, wherein the connection pipe includes a main body where the two intermediate pipe portions and the two fluid outlets are formed, and a pipe where the one fluid inlet is formed protruding from a lengthwise central portion of the main body.

6. The fuel cell stack according to claim 1, wherein the connection pipe includes a main body where the two intermediate pipe portions and the two fluid outlets are formed, and a pipe where the one fluid inlet is formed protruding from the main body in a direction perpendicular to the stacking direction.

7. The fuel cell stack according to claim 6, wherein the main body extends vertically in a direction intersecting with the stacking direction of the fuel cells when the fuel cell stack is installed in a vehicle, and wherein the pipe protrudes from the main body in a horizontal direction.

8. The fuel cell stack according to claim 7, wherein the pipe protrudes from a lengthwise central portion of the main body.

9. A fuel cell stack formed by stacking a plurality of fuel cells in a stacking direction, the fuel cells each being formed by stacking a membrane electrode assembly and a separator together, the membrane electrode assembly including a pair of electrodes and an electrolyte membrane interposed between the electrodes, end plates being provided at both ends in the stacking direction of the fuel cells, a fluid passage extending through the fuel cells in the stacking direction for allowing at least one of reactant gases or a coolant to flow through the fluid passage, a connection pipe connecting the fluid passage and an external pipe being connected to at least one of the end plates, wherein the connection pipe integrally has one fluid outlet, only two intermediate pipe portions branched from the one fluid outlet at a branching point, and only two fluid inlets respectively provided for the two intermediate pipe portions, wherein a total intermediate opening cross sectional area that is a sum of cross sectional area of the two intermediate pipe portions is larger than an outlet opening cross sectional area of the one fluid outlet, the intermediate opening cross sectional area of the intermediate pipe portion being an area perpendicular to a flow direction of the fluid flowing through the intermediate pipe portion; and the outlet opening cross sectional area of the one fluid outlet being an area perpendicular to a flow direction of the fluid flowing through the one fluid outlet, wherein the total intermediate opening cross sectional area is larger than a total inlet opening cross sectional area that is a sum of cross sectional areas the two fluid inlets; the inlet opening cross sectional area of the fluid inlet being an area perpendicular to a flow direction of the fluid flowing through the fluid inlet, wherein said connection pipe has an inner wall surface over an area from the one fluid outlet to each of the two intermediate pipe portions, and over an area from each of the two fluid inlets to each of respective said intermediate pipe portions, and wherein the inner wall surface of the connection pipe is smooth and continuous as a whole, and only includes an outward curved surface which is curved outward in a length direction from the one fluid outlet towards a mid portion of the connection pipe, and also from each of the fluid inlets towards the mid portion of the connection pipe.

10. The fuel cell stack according to claim 9, wherein the branching point is positioned between the two fluid inlets.

11. The fuel cell stack according to claim 9, wherein the two fluid inlets are spaced vertically from each other in a direction intersecting with the stacking direction of the fuel cells when the fuel cell stack is installed in a vehicle.

12. The fuel cell stack according to claim 9, wherein a cross-sectional shape of the two fluid inlets is different from a cross-sectional shape of the one fluid outlet, and an opening cross-sectional shape of the connection pipe is formed so as to change smoothly from the two fluid inlets to the one fluid outlet.

13. The fuel cell stack according to claim 9, wherein the connection pipe includes a main body where the two intermediate pipe portions and the two fluid inlets are formed, and a pipe where the one fluid outlet is formed protruding from a lengthwise central portion of the main body.

14. The fuel cell stack according to claim 9, wherein the connection pipe includes a main body where the two intermediate pipe portions and the two fluid inlets are formed, and a pipe where the one fluid outlet is formed protruding from the main body in a direction perpendicular to the stacking direction.

15. The fuel cell stack according to claim 14, wherein the main body extends vertically in a direction intersecting with the stacking direction of the fuel cells when the fuel cell stack is installed in a vehicle, and wherein the pipe protrudes from the main body in a horizontal direction perpendicular to the stacking direction.

16. The fuel cell stack according to claim 15, wherein the pipe protrudes from a lengthwise central portion of the main body.

17. A fuel cell stack formed by stacking a plurality of fuel cells in a stacking direction, the fuel cells each being formed by stacking a membrane electrode assembly and a separator together, the membrane electrode assembly including a pair of electrodes and an electrolyte membrane interposed between the electrodes, end plates being provided at both ends in the stacking direction of the fuel cells, a fluid passage extending through the fuel cells in the stacking direction for allowing at least one of reactant gases or a coolant to flow through the fluid passage, at least one of the end plates being connected to a first connection pipe connecting the fluid passage and a first external pipe and a second connection pipe connecting the fluid passage and a second external pipe, wherein the first connection pipe integrally has one first fluid inlet, only two first intermediate pipe portions branched from the one first fluid inlet at a branching point, and only two first fluid outlets respectively provided for the two first intermediate pipe portions, wherein a first total intermediate opening cross sectional area that is a sum of cross sectional areas of the two first intermediate pipe portions is larger than a first inlet opening cross sectional area of the one first fluid inlet; the first intermediate opening cross sectional area of the first intermediate pipe portion being an area perpendicular to a flow direction of the fluid flowing through the first intermediate pipe portion; and the first inlet opening cross sectional area of the one first fluid inlet being an area perpendicular to a flow direction of the fluid flowing through the one first fluid inlet, wherein the first total intermediate opening cross sectional area is larger than a first total outlet opening cross-sectional area that is a sum of cross sectional areas of the two first fluid outlets; the first fluid outlet opening cross sectional area of the first fluid outlet being an area perpendicular to a flow direction of the fluid flowing through the first fluid outlet, wherein said first connection pipe has a first inner wall surface over an area from the one first fluid inlet to each of the two first intermediate pipe portions, and over an area from each of the two first fluid outlets to each of respective said two first intermediate pipe portions, wherein the first inner wall surface of the first connection pipe is smooth and continuous as a whole, and includes an outward curved surface which is curved outward in a length direction from the one first fluid inlet towards a mid portion of the first connection pipe, and also from each of the first fluid outlets towards the mid portion of the first connection pipe, wherein the second connection pipe integrally has one second fluid outlet, only two second intermediate pipe portions branched from the one second fluid outlet at a branching point, and only two second fluid inlets respectively provided for the two second intermediate pipe portions, wherein a second total intermediate opening cross sectional area that is a sum of cross sectional areas of the two second intermediate pipe portions is larger than a second outlet opening cross sectional area of the one second fluid outlet; the second intermediate opening cross sectional area of the second intermediate pipe portion being an area perpendicular to a flow direction of the fluid flowing through the second intermediate pipe portion; and the second outlet opening cross sectional area of the one second fluid outlet being an area perpendicular to a flow direction of the fluid flowing through the one second fluid outlet, wherein the second total intermediate opening cross sectional area is larger than a second total inlet opening cross sectional area that is a sum of cross sectional areas of the two second fluid inlets; the second fluid inlet opening cross sectional area of the second fluid inlet being an area perpendicular to a flow direction of the fluid flowing through the second fluid inlet, wherein said second connection pipe has a second inner wall surface over an area from the one second fluid outlet to each of the two second intermediate pipe portions, and over an area from each of the two second fluid inlets to each of respective said two second intermediate pipe portions, and wherein the second inner wall surface of the second connection pipe is smooth and continuous as a whole, and includes an outward curved surface which is curved outward in a length direction from the one second fluid outlet towards a mid portion of the second connection pipe, and also from each of the second fluid inlets towards the mid portion of the second connection pipe.

18. The fuel cell stack according to claim 17, wherein the first connection pipe and the second connection pipe are aligned horizontally, when the fuel cell stack is installed in a vehicle, and the one first fluid inlet and the one second fluid outlet are positioned on a same side with respect to the first connection pipe and the second connection pipe.

* * * * *